C. C. BOLEN AND C. E. McKEE.
CHILD'S VEHICLE.
APPLICATION FILED JAN. 29, 1920.

1,359,957.

Patented Nov. 23, 1920.
2 SHEETS—SHEET 1.

INVENTORS
Charles C. Bolen
Clarence E. McKee

By Baker Macklin, ATTORNEYS

C. C. BOLEN AND C. E. McKEE.
CHILD'S VEHICLE.
APPLICATION FILED JAN. 29, 1920.

1,359,957.

Patented Nov. 23, 1920.
2 SHEETS—SHEET 2.

INVENTORS
Charles C. Bolen,
Clarence E. McKee,
By Baker Macklin, ATTORNEYS

UNITED STATES PATENT OFFICE.

CHARLES C. BOLEN, OF MARION, AND CLARENCE E. McKEE, OF COLUMBUS, OHIO.

CHILD'S VEHICLE.

1,359,957.  Specification of Letters Patent.  Patented Nov. 23, 1920.

Application filed January 29, 1920. Serial No. 354,999.

*To all whom it may concern:*

Be it known that we, CHARLES C. BOLEN and CLARENCE E. McKEE, citizens of the United States, residing at Marion and Columbus, respectively, in the counties of Marion and Franklin, respectively, and the State of Ohio, have invented a certain new and useful Improvement in Children's Vehicles, of which the following is a full, clear, and exact description, reference being had to the accompanying drawings.

This invention relates to vehicles of the manually propelled type especially adaptable for children.

An object of our invention is the provision of a child's vehicle which will enable the rider to safely and rapidly propel himself about streets or walks, and steer the device, all by arm movement, and from a position which may be very quickly and readily assumed. Other objects are the designing of a vehicle which shall be attractive to the rider, simple in operation and construction, cheap in manufacture, and strong and durable in use. Further features and objects are hereinafter more fully pointed out and the essential characteristics of the invention summarized in the claims.

Figure 1:
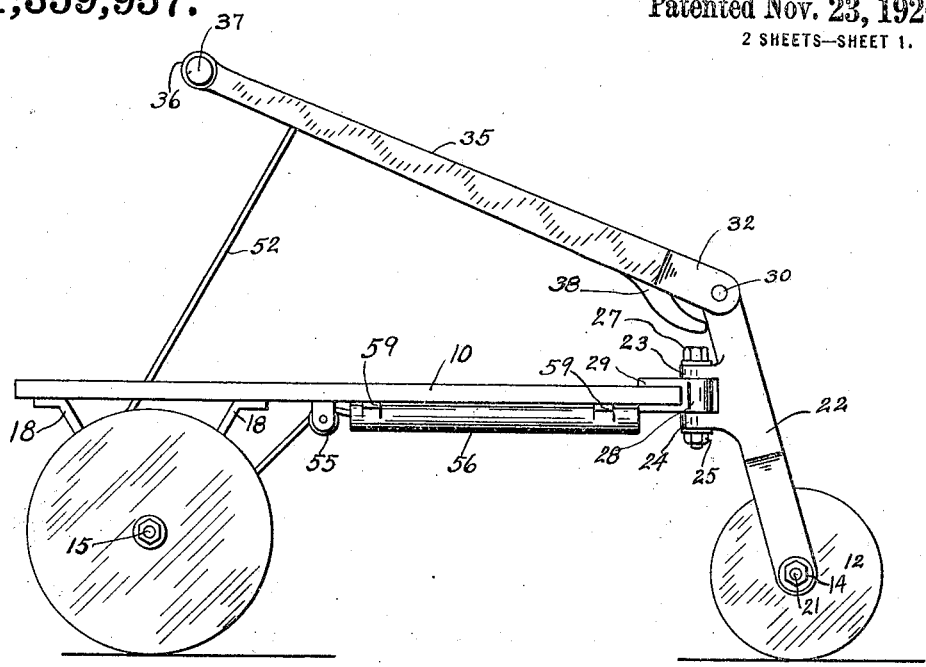
Figure 2:
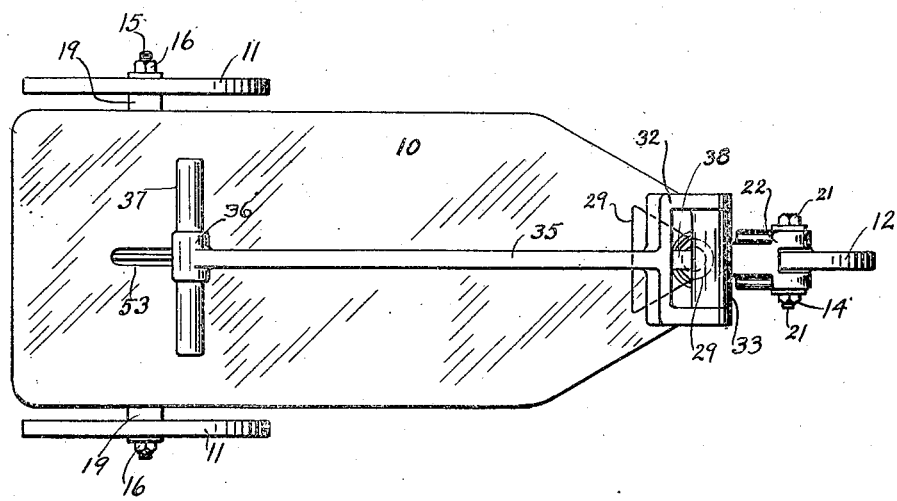
Figure 3:
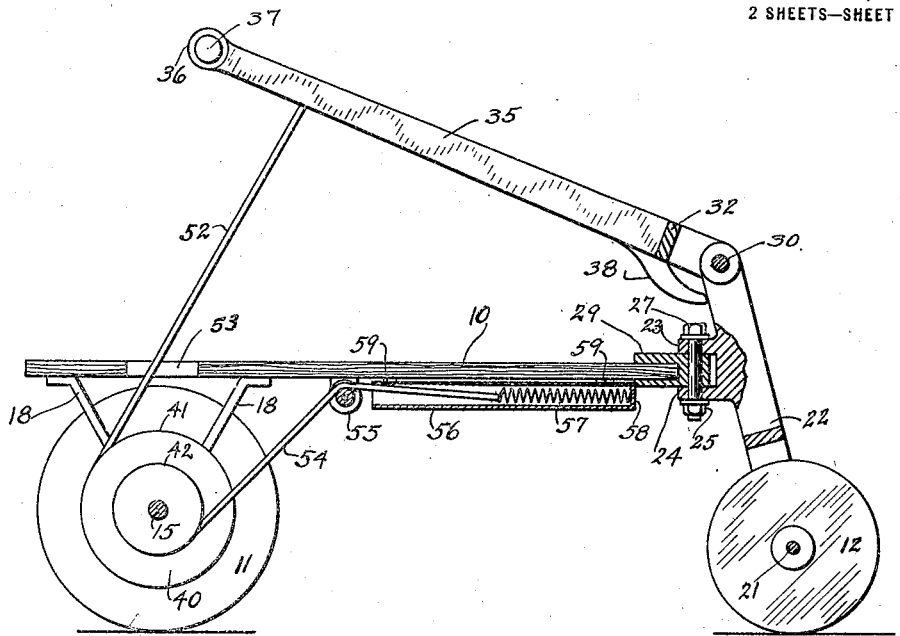
Figure 4:
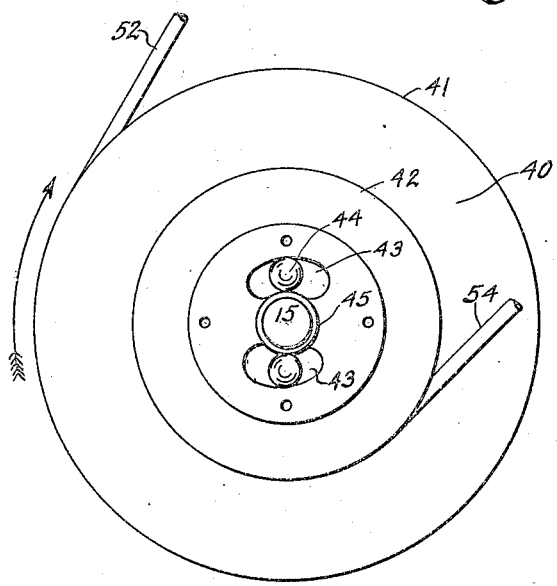
Figure 5:
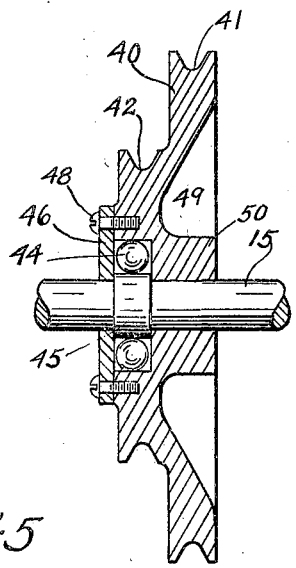

In the drawings, which illustrate a preferred embodiment of our invention, Figure 1 is a side elevation of the vehicle constituting our invention; Fig. 2 is a plan; Fig. 3 is a longitudinal section showing parts in elevation; Fig. 4 is an elevation on an enlarged scale of the pulley and clutch driving means; and Fig. 5 is a vertical transverse section through the same.

Referring to the drawings by numerals, 10 designates the platform of our vehicle, which is supported by rear wheels 11 and a single forward wheel 12. The rear wheels are mounted rigidly on the ends of an axle 15 and secured thereto, as by nuts 16. The rear axle 15 is connected to the platform 10 by brackets 18 having tubular bearings 19 rigid therewith through which the ends of the axle project.

The forward wheel 12 is embraced within the arms of a fork 22, and is secured on a pivot which may comprise a bolt 21 having a nut 14 thereon to hold it in place. Extending rearwardly from the stem or shank portion of the fork 22 are the lugs 23 and 24 which have openings therethrough in vertical registry, through which passes a pivot pin or bolt 27, preferably secured by a nut 25 on its lower threaded end. Embraced between the lugs 23 and 24 and pivoted on the bolt 27 is a collar 28 having a bifurcated rear extension 29 adapted to embrace the upper and lower faces of the forward end of the platform 10, and secured thereto in any suitable manner. The shank of the fork 22 extends above the upper lug 23 and terminates in a transverse rod 30. This member 30 is pivoted in the forward ends of the arms of a yoke 32 constituting the forward portion of an arm 35. Surrounding the member 30 and embraced between the arms of the yoke 32 is a collar 33.

The rear end of the arm 35 is provided with a suitable handle; thus there may be on the arm a tubular member 36 within which is rigidly secured at its center a transverse bar 37 constituting handles or grips.

The arm 35 may be prevented from swinging on its pivot 30 and dropping to the platform 10 by means of an extension 38 projecting forwardly and downwardly between the arms of the yoke 32; the forward end of this extension 38 being adapted to rest against the rear of the upper portion of the fork shank 22 and thereby limit the downward movement of the arm 35.

The driving or propelling means comprises a pulley wheel having a ratchet connection with the center of the axle, and cables connected to the handle 35 and to a returning spring. This pulley 40 comprises preferably a casting having a large sheave 41 and a smaller one 42. The pulley is provided with a central opening adapted to receive the shaft 15, and carries a suitable ratchet clutch adapted to engage the axle. As shown, the ratchet clutch is of the ball type, though any other satisfactory type may be used. As shown, one side of the casting is provided with arcual recesses 43 of gradual varying width adapted to receive balls 44 fitting approximately the center of the recesses. The shaft 15 has adjacent to the balls 44 a rigid collar 45 which, with the balls and tapered slots in the pulley, constitute the ball driving clutch. The balls 44 may be retained within the recesses 43 around the collar 45 on the shaft 15 by means of a plate 46 having a central opening permitting it to be slipped over the end of the shaft 15, and is secured to the side of the pulley 40 as by cap screws 48. To reduce weight the opposite side of the pulley may be recessed annularly as at 49 between a hub portion 50 and the sheave 41.

A cable 52 is connected near the outer end of the arm 35, and extends downwardly through a slot 53 in the rear portion of the platform 10. Its opposite end extends around and is secured to the sheave 41 of the pulley 40 which is mounted on the axle 15 beneath the slot 53. Another cable 54 has one end secured to the sheave 42 around which it passes, and its other end, as shown, extends over a guide pulley 55, supported from the lower side of the platform 10, and into a tubular housing 56 and is attached to the free end of a helical spring 57 contained therein, the other end of which spring is secured to the forward end of the housing as at 58. The housing 56 is secured to the under side of the platform 10, as by ears 59, and extends longitudinally along the center thereof between the collar 28 and the guide pulley 55.

In operation, the rider stands on the rear end of the platform 10 over the axle 15 and grasps the handles 37 and pulls upwardly, the arm 35 swinging on the pivot 30, at the same time steering the vehicle by movement of the arm 35 to the right or left about the vertical pivot 27, thereby turning the front wheel correspondingly. This upward movement of the arm 35 causes the cable 52 to rotate the pulley 40 in the direction indicated by the arrow in Fig. 4, as it unwinds from the sheave 41, which causes the reduced ends of the slots 43 to wedge the balls 44 tightly against the collar 45 on the shaft 15 and thereby effect the rotation of the shaft and wheels 11, to propel the vehicle.

The movement of the pulley 40, as indicated, winds the cable 54 about the sheave 42 against the tension of the spring 57. When the upward stroke of the handle 45 is completed and the operator's pull relaxed, the spring 57 contracts and rotates the pulley 40 in the opposite direction, unwinding the cable 54 from the sheave 42, and re-winding the cable 52 about the sheave 41, returning therewith the arm 35 to its lowermost position, as illustrated in Figs. 1 and 3. Meanwhile, under the impulse given, the axle 15 will continue to rotate and the vehicle will coast, thereby loosening the clutch 43, 44 from the collar 45, until the vehicle either stops, or is given a new impulse through a succeeding upward stroke of the arm 35 which will further advance it in the same manner as before.

From the foregoing, it will be apparent that our device is very simple in construction and operation in view of the combined propelling and steering mechanism. On account of its low cost and the ease and safety with which it may be operated, it is especially adapted for children and affords them a very convenient and useful vehicle. The rider has merely to jump on the platform, and without stopping to adjust himself in a seat or to complicated mechanism, operate the single arm to steer the vehicle and give it a forward impulse whenever he may desire. This feature, together with that of the ratchet clutch mechanism which enables the vehicle to run under momentum with the propelling arm stationary, makes its appeal to children and causes the vehicle to be very attractive to them.

We claim:

1. In a vehicle having a platform supported on wheels at the front and rear ends, the rear end of said platform being unobstructed, rigid steering means connected to the front end of said platform and the front wheel and extending toward the rear end, ratchet driving means connected adjacent to the rear end of the platform and the rear wheels, and a member connecting the ratchet driving means with said steering means.

2. A vehicle comprising a supporting member, a rear driving axle secured thereto, a fork pivoted to said supporting member and embracing a front wheel, actuating means for said rear axle, and means above said supporting member pivoted at one end to said fork and connected near the other end with said actuating means whereby the vehicle may be both steered and propelled.

3. A vehicle comprising a platform having an open end, a rear driving axle secured thereto having wheels rigidly mounted thereon, a substantially vertical member pivoted at an intermediate point to the forward end of said platform, intermittent actuating means for said rear axle, and a handle connected with said member and said means for steering and propelling the vehicle.

4. In a vehicle comprising a rear wheel supported on an axle in a fixed plane, and a dirigible front wheel, a member connecting said wheels and extending rearwardly of said rear wheel, whereby a rider may readily mount the vehicle from the rear, means embracing the front wheel and secured to the forward end of said member, and a combined rigid steering and operating member pivoted to said means, said last mentioned member being connected with the rear axle by a cable and a ratchet clutch.

5. In a vehicle comprising a pair of rigidly supported rear wheels and a dirigible front wheel, a platform mounted above the rear wheels, a fork embracing the front wheel and pivoted to the forward end of the platform, a steering arm pivoted to said fork, said arm having flexible means connecting it with the axle of the rear wheels, whereby the vehicle may be propelled.

6. A vehicle comprising a platform, a fork having rearwardly extending lugs embracing the forward end of said platform and pivoted thereto, a steering arm pivoted to said fork and extending rearwardly over the platform, an axle mounted in bearings depending from the rear of said platform, ratchet clutch mechanism on said axle, a retractile spring secured to said platform, and rope and pulley mechanism associated with said clutch mechanism and connected with said steering arm and retractile spring.

7. In a vehicle having a supporting member, driving mechanism at the rear end thereof and steering mechanism pivoted to the forward end and extending toward the rear, said driving mechanism including a rotatable axle, a pulley and clutch mechanism on said axle, a returning spring secured to said supporting member, and means connecting said pulley and clutch mechanism with said steering mechanism and with said returning spring.

8. In a vehicle having a platform, driving mechanism at the rear end thereof and steering mechanism pivoted to the front end and extending toward the rear end, said driving mechanism including a rotatable axle having wheels rigidly mounted at its ends, a returning spring secured to said platform and a pulley and clutch mechanism on said axle comprising two rigidly connected sheaves, and cables connecting one of said sheaves with said steering means and the other with said returning spring.

9. A vehicle comprising a platform, depending bearing brackets rigidly supported at one end thereof, an axle having wheels rigidly secured thereto mounted in said brackets, a pulley on said axle, a ratchet clutch mechanism associated with said pulley adapted to intermittently grip the axle, a front wheel, a combined propelling and steering arm pivoted at the forward end of the vehicle to said front wheel, and means connecting said pulley with said arm.

10. In a vehicle, a platform, a propelling handle secured to the front end thereof and extending toward the rear, a rear axle, pulley mechanism on said axle comprising two sheaves, a clutch mechanism within said pulley adapted to engage said axle, a retractile spring having one end fixed, cables connected to said sheaves, one being secured to said propelling handle and the other to said spring.

11. In a vehicle, a platform, a steering and propelling arm secured to the front end thereof and extending toward the rear, an axle and wheels supporting the rear of said platform, a pulley on said axle having two sheaves of different sizes, clutch mechanism partly carried by said pulley and adapted to engage said axle, a spring having one end fast to said platform, cables connected to said sheaves, one extending through a slot in the platform and secured to said arm, and the other secured to the other end of the spring.

12. In a vehicle, a front wheel, a platform, a fork pivoted thereto and embracing said wheel, a steering and propelling arm pivoted to said fork and extending toward the rear, an axle and wheels supporting the rear of said platform, a pulley on said axle having two sheaves of different sizes, clutch mechanism within said pulley adapted to engage said axle, cables connected to said sheaves, one extending through a slot in the platform and secured to said arm, and a tension spring secured to the under side of said platform and having its other end secured to the other cable.

13. In a vehicle, a platform, a movable propelling arm, an axle and wheels supporting the platform, a pulley on said axle having two sheaves of different sizes, clutch mechanism associated with said pulley adapted to engage said axle, a housing secured to the platform, a spring within the housing, cables connected to said sheaves, one secured to said arm, and the other secured to the end of the spring.

14. In a vehicle having a supporting member, the combination of a driving axle, a pulley and clutch mechanism on said axle, said mechanism including two rigidly connected sheaves, an operating member above said supporting member and adapted to be engaged by the hands of the rider, a returning spring, and cables connecting one of said sheaves with said operating member and the other with said returning spring.

In testimony whereof, we hereunto affix our signatures.

CHARLES C. BOLEN.
CLARENCE E. McKEE.